Jan. 18, 1955
D. E. FRITZ
2,700,124
GENERATOR FAULT PROTECTOR
Filed Jan. 12, 1950
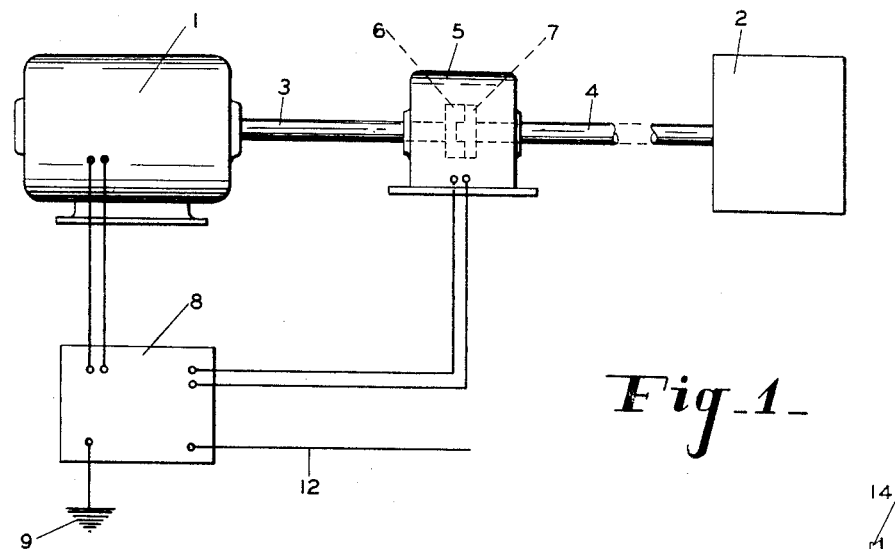
*Fig_1_*
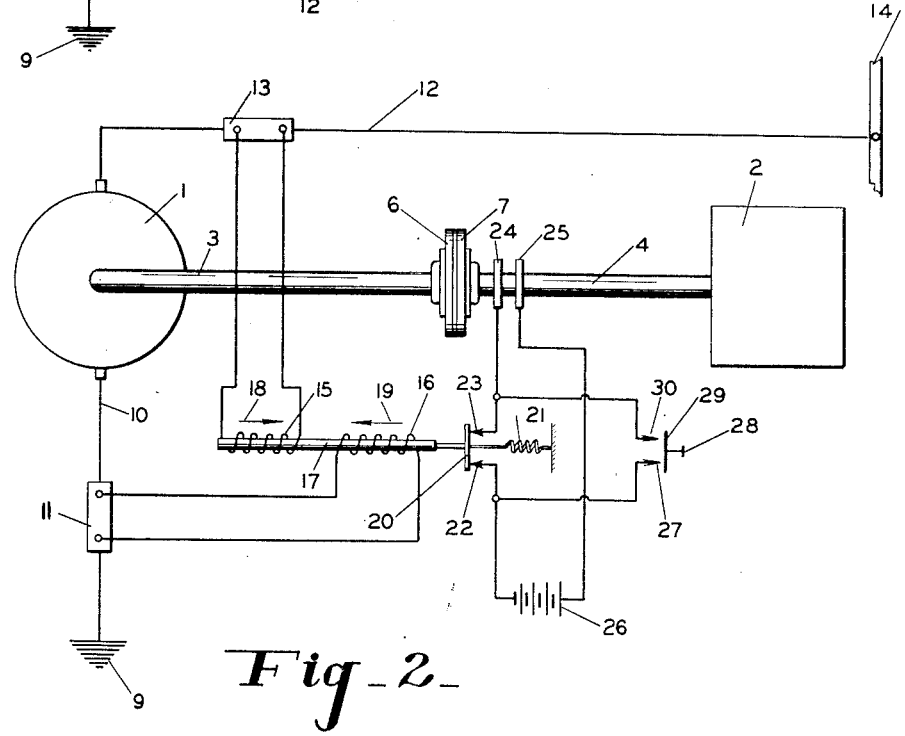
*Fig_2_*
INVENTOR.
DWAIN E. FRITZ
BY
ATTORNEY & # United States Patent Office 2,700,124
Patented Jan. 18, 1955

2,700,124

GENERATOR FAULT PROTECTOR

Dwain E. Fritz, Cleveland, Ohio, assignor to Jack & Heintz Precision Industries, Inc., Cleveland, Ohio, a corporation of Delaware Application January 12, 1950, Serial No. 138,081

4 Claims. (Cl. 317—13)

This invention relates in general to fault protectors for electrical systems and more specifically to protective systems for protection against faults in generator systems, including the generator itself.

The conventional approach to the problem of protection against generator faults has been to protect the electrical system externally of the generator itself.

My experience has been that faults more often occur internally of the generator itself than the external electrical system. This constitutes a definite hazard resulting in the destruction of expensive generators and also the hazard of fire. Despite the electrical precautions for the detection of ground faults, the conventional systems do not preclude against the prime mover continuing to drive the generator after the occurrence of a generator fault. Such a continued drive of the generator destroys the same and creates the hazard of fire.

It is therefore one of the primary objects of my invention to provide a simple, positive and effective means for automatic disconnection of the drive from the prime mover to the generator upon the occurrence of any electrical fault in the system or the generator.

It is a further object to provide an electrical means that may be manually controlled for effecting a mechanical drive from the prime mover to the generator and which electrical means operates automatically to disconnect the mechanical drive upon the occurrence of any fault in the system or generator.

With the foregoing and other objects in view, the invention resides in the combination of parts and in the details of construction hereinafter set forth in the following specification and appended claims, certain embodiments thereof being illustrated in the accompanying drawings, in which:

Figure 1 is a diagrammatical illustration of one form that my invention may take, showing the prime mover and generator and an electrically operated clutch drive therebetween and the attending wiring circuit; and Figure 2 is a similar diagram showing a push button for engaging the clutch and the normally balanced opposed coils for disengaging the clutch when the same become unbalance due to electrical faults.

Referring more particularly to the drawings, the generator is shown at 1 and the prime mover at 2. The generator is driven by shaft 3 and a shaft 4 is driven by the prime mover. Shafts 3 and 4 extend into a clutch housing 5 and carry at their adjacent ends, engageable and disengageable clutch elements, shown in Figure 1 in dotted lines at 6 and 7. Figure 1 also shows appropriate leads to a conventional control box 8 and to ground at 9; leads from the control box to the clutch housing 5 and a lead to the main bus.

In Figure 2, I have shown, in some further detail, one appropriate form that my invention may take. The generator may be of any conventional design and the prime mover may be of any type, such as for example, an internal combustion engine. The clutch may be of any convenient design, such as a standard electrically operated clutch.

Lead 10 connects the negative side of the generator through shunt 11 to ground 9. Lead 12 connects the positive side of the generator through shunt 13 to the main bus 14 and coil 15 is connected to shunt 13 and coil 16 is connected to shunt 11, and a common armature 17 extends through both coils. Current passes through coil 15 in the direction of arrow 18 and through coil 16 in the opposed direction of arrow 19.

Armature 17 carries a contact plate 20 that is normally urged by a tension coil spring 21 into contact with contacts 22 and 23. In circuit with contacts 22 and 23 are a pair of rings 24 and 25 and a battery 26. The circuit also includes a pair of contacts 27 and 30, a manual push button 28 and a contact plate 29.

Coils 15 and 16 are opposed and predeterminedly balanced so that as long as no fault occurs internally of the generator, plate 20 of armature 17 remains in engagement with contacts 22 and 23 under the urging of spring 21. This brings rings 24 and 25 into closed circuit with battery 26 to maintain the electromagnetic clutch engaged and a continuous drive of the generator by the engine continues as long as the latter is in operation.

Should, however, an electrical internal generator fault occur, an unbalance will occur, causing a movement of the armature and contact plate to the left, breaking the circuit from the battery to the electromagnetic clutch to automatically disengage the latter. Hence, as soon as such an electrical internal fault occurs, the mechanical drive by the engine of the generator is automatically and instantly disconnected and discontinued.

Push button 28 with plate 29 and contacts 30 and 27, the latter being in circuit with the battery, provide a means for push button energizing of the system for subsequent operation.

Thus, from the foregoing, it will be seen that I have provided a simple, effective and instantaneous means for automatically disconnecting and discontinuing the drive of such an electrical device as a generator by a prime mover, such as an engine, upon the occurrence of an electrical fault in the system or the generator. I have further provided in such a device an electrical means for disconnecting a mechanical driving connection between the generator and engine so as to prevent any further damage of the generator that would otherwise result from such drive after an internal electrical fault in the system or the generator.

I claim:

1. In combination with an electrical system including a generator, a prime mover and a driving means for driving said generator by said prime mover, positively engaging mechanical clutch means in said driving means, electrical means connected to said generator and said clutch means for automatically disengaging said clutch means upon the occurrence of an electrical fault in said system or said generator, said electrical means comprising a power source, a pair of opposed coils connected through shunts to the electrical opposite sides of said generator and having a common armature normally in circuit with said power source and said clutch means.

2. In combination with an electrical system including a generator, a prime mover and a driving means for driving said generator by said prime mover, positively engaging mechanical clutch means in said driving means, electrical means connected to said generator and said clutch means for automatically disengaging said clutch means upon the occurrence of an internal electrical fault in said system or said generator, said electrical means comprising a power source, a pair of normally balanced opposed coils connected through shunts to the electrical opposite sides of said generator and having a common armature normally spring urged into circuit with said power source and said clutch means.

3. In combination with an electrical system including a generator, a prime mover and a driving means for driving said generator by said prime mover, positively engaging mechanical clutch means in said driving means, electrical means connected to said generator and said clutch means for automatically disengaging said clutch means upon the occurrence of an electrical fault in said system or said generator, said electrical means comprising a power source, a pair of opposed coils connected through shunts to the electrical opposite sides of said generator and having a common armature normally in circuit with said power source and said clutch means and a manually operable switch means for energizing the circuit for subsequent operation.

4. In combination with an electrical system including a generator, a prime mover and a driving means for driving said generator by said prime mover, positively engaging mechanical clutch means in said driving means, electrical means connected to said generator and said clutch means for automatically disengaging said clutch means upon the occurrence of an electrical fault in said system or said generator, said electrical means comprising a power source, a pair of normally balanced opposed coils connected through shunts to the electrical opposite sides of said generator and having a common armature normally spring urged into circuit with said power source and said clutch means and a manually operable switch means for energizing the circuit for subsequent operation.

References Cited in the file of this patent

UNITED STATES PATENTS

| Number | Name | Date |
|---|---|---|
| 1,023,264 | McElroy | Apr. 16, 1912 |
| 1,157,011 | Leonard | Oct. 19, 1915 |
| 1,305,612 | Langdon-Davis | June 3, 1919 |
| 1,524,562 | Kuyser | Jan. 27, 1925 |
| 1,731,971 | Courtin et al. | Oct. 15, 1929 |
| 1,760,541 | Bruckel | May 27, 1930 |
| 2,280,914 | Johns | Apr. 28, 1942 |
| 2,462,624 | Fletcher | Feb. 22, 1949 |
| 2,534,895 | Austin et al. | Dec. 19, 1950 |

FOREIGN PATENTS

| Number | Country | Date |
|---|---|---|
| 19,285 | Great Britain | Sept. 23, 1905 |
| 108,871 | Great Britain | Aug. 17, 1917 |
| 79,227 | Switzerland | Nov. 1, 1919 |
| 466,978 | France | May 29, 1914 |